(12) United States Patent
Bieger

(10) Patent No.: US 11,113,968 B2
(45) Date of Patent: Sep. 7, 2021

(54) METHOD FOR MOBILE PARKING ASSISTANCE

(71) Applicant: Continental Automotive GmbH, Hannover (DE)

(72) Inventor: Stefan Bieger, Nidda (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/956,289

(22) PCT Filed: Dec. 17, 2018

(86) PCT No.: PCT/EP2018/085145
§ 371 (c)(1),
(2) Date: Jun. 19, 2020

(87) PCT Pub. No.: WO2019/121478
PCT Pub. Date: Jun. 27, 2019

(65) Prior Publication Data
US 2021/0082285 A1 Mar. 18, 2021

(30) Foreign Application Priority Data
Dec. 21, 2017 (DE) ..................... 10 2017 223 607.8

(51) Int. Cl.
*G08G 1/14* (2006.01)
*G08G 1/01* (2006.01)
*G06K 9/00* (2006.01)

(52) U.S. Cl.
CPC .......... *G08G 1/144* (2013.01); *G08G 1/0108* (2013.01); *G08G 1/142* (2013.01); *G08G 1/148* (2013.01);
(Continued)

(58) Field of Classification Search
CPC ....... B60R 25/00; B60R 25/24; B60R 25/241; B60R 25/243; G08G 1/14; G08G 1/141;
(Continued)

(56) References Cited

U.S. PATENT DOCUMENTS 10,156,848 B1 * 12/2018 Konrardy ............ B60R 16/0234
10,431,086 B2 * 10/2019 Lee .......................... B60D 1/30
(Continued)

FOREIGN PATENT DOCUMENTS

| DE | 102010029419 A1 | 12/2010 |
|---|---|---|
| DE | 102012017934 A1 | 3/2014 |
| WO | 2015/031001 A2 | 3/2015 |

OTHER PUBLICATIONS

Office Action dated Nov. 21, 2018 from corresponding German Patent Application No. DE 10 2017 223 607.8.
(Continued)

*Primary Examiner* — Van T Trieu

(57) ABSTRACT

A method for assisting in the parking of a vehicle in a vacant parking area, wherein the position of at least one vacant parking area is calculated on the basis of a vehicle-to-vehicle and/or a vehicle-to-infrastructure communication from the current position of the vehicle and is conveyed to a navigation apparatus of the vehicle, wherein a parking process is started by virtue of a radio key of the vehicle being placed onto a smartphone display, so that a lens in the vehicle key captures a flashing code and the radio key returns the flashing codes to the vehicle by radio.

14 Claims, 3 Drawing Sheets

(52) U.S. Cl.
CPC ......... *G08G 1/149* (2013.01); *G06K 9/00812* (2013.01)

(58) Field of Classification Search
CPC ........ G08G 1/143; G08G 1/144; G08G 1/145; G08G 1/149
See application file for complete search history.

(56) References Cited

U.S. PATENT DOCUMENTS

| | | |
|---|---|---|
| 2013/0222591 A1 | 8/2013 | Alves |
| 2015/0161832 A1* | 6/2015 | Esselink ................ B60R 25/24 340/5.22 |
| 2016/0144857 A1 | 5/2016 | Ohshima |
| 2017/0144654 A1 | 5/2017 | Sham |
| 2018/0297558 A1* | 10/2018 | Froitzheim ............. E05B 81/00 |
| 2019/0382543 A1* | 12/2019 | Fujioka ................... C08J 5/041 |

OTHER PUBLICATIONS

International Search Report and Written Opinion dated Mar. 25, 2019 from corresponding International Patent Application No. PCT/EP2018/085145.

\* cited by examiner

METHOD FOR MOBILE PARKING ASSISTANCE

BACKGROUND

The present invention relates to a method for mobile parking assistance and therefore for assisting in the parking of a vehicle in a vacant parking area or parking space and to a corresponding apparatus and a corresponding computer program product.

The document DE 10 2006 026 092 A1 discloses a method for controlling an at least semiautomatically performable parking process by means of which a motor vehicle is able to be brought from an actual position to a desired position. This involves details pertaining to possible target positions (e.g. vacant parking spots) being obtained from a database outside the motor vehicle by means of wireless communication. The description also states that if the motor vehicle is in structured surroundings of a parking spot allocation system, the actual position of the motor vehicle is e.g. determinable by means of suitable sensors of a parking garage. This is a comparatively inaccurate ascertainment of the actual position. The specified method furthermore concentrates on parking the vehicle over a trajectory or on determining a possible target position.

The document DE 10 2008 027 692 A1 describes a method for assisting a driver of a vehicle in a parking process that involves the driving assistance system using various sensors for capturing the environment of the vehicle, for example ultrasonic sensors, radar sensors, optically based sensors, that have an accuracy in the range of centimeters for capturing distances. The driving assistance system or the vehicle is furthermore equipped with a GPS system in order to ascertain the position of the vehicle. Further sensors used are preferably front or rear viewing systems. The known method automatically looks for a suitable parking area for the vehicle and parks thereon.

Additionally, the document DE 10 2008 024 964 A1 discloses a method for operating a driving assistance system when parking a vehicle in a lateral parking space that involves vehicle-to-vehicle communication being used to convey a status of the activation of a parking assist system of a parking vehicle to a following vehicle, so that the driver of the following vehicle is informed or at least pre-warned about possible braking maneuvers by the parking vehicle. There is also the possibility of information about a possible imminent braking maneuver being transmitted to the following vehicle by means of a vehicle-to-vehicle communication.

When parking a vehicle, there is the need to obtain information about available parking options with little additional technical complexity in order to allow parking with little time involvement and little environmental pollution. The known methods described above firstly work with a comparatively high level of technical complexity or consider only a partial aspect when procuring information about available parking options.

BRIEF SUMMARY

The object of the present invention is accordingly that of specifying a simple method or providing a technically uncomplex apparatus that speeds up parking on a vacant parking area.

The object is achieved by a method according to the features of claim 1.

In particular, the method according to the invention involves the position of at least one vacant parking area being calculated on the basis of a vehicle-to-vehicle communication (C2C communication below for short) and/or a vehicle-to-infrastructure communication (C2I communication below for short) from the current position of the vehicle and being conveyed to a navigation apparatus of the vehicle. C2C communication and C2I communication are frequently also combined using the term C2X communication.

The advantage of the method according to the invention is that all the technical means necessary for finding vacant parking areas are already present in the vehicle for vehicle-to-vehicle communication or vehicle-to-infrastructure communication and merely need to be used in a suitable manner in order to assist in the parking of vehicles. In particular, the vehicles frequently contain a Global Positioning System or other positioning system, which allow positions and hence vacant parking areas to be found very accurately for parking. Global navigation systems at present are in particular satellite navigation systems such as GPS, Galileo, GLONASS (Russia), Compass (China), IRNSS (India), etc. The very accurate positioning of the vehicle is used for the present invention in order to easily ascertain vacant parking areas.

A navigation apparatus is currently preferably likewise frequently already present in vehicles as part of a positioning system. If the positions of the vacant parking areas are known, the navigation apparatus can be used to calculate a routing to a parking area selected by the driver. For this, the vacant parking areas can first be displayed on a suitable display device of the navigation apparatus, so that the driver can select a parking area that appears to him to be the most suitable for his vehicle.

In this instance, parking area denotes a parking space or spot for parking that is appropriate for a single vehicle. By contrast, a car park below is a facility for parking a vehicle having a multiplicity of parking areas that can be vacant or occupied.

In a preferred exemplary embodiment, the position of the vacant parking area is conveyed to the navigation apparatus when the vehicle is in a previously defined region with reference to the vacant parking area, preferably at the barrier of a parking facility. In this instance, a car park or a parking garage is denoted by the collective term parking facility. Information pertaining to the vacant parking areas is preferably conveyed by means of short-range radio (e.g. infrared, Bluetooth, DSRC, ITS-G5, WLAN, etc.). The information pertaining to the vacant parking areas can be transmitted as absolute positions or relative positions, for example. Furthermore, the vehicle can be put into what is known as a parking mode after the position information has been conveyed to the navigation apparatus. In this mode, a particular form of presentation by the display device that facilitates the selection of a suitable vacant parking area is selected, for example.

In a development of the invention, after the vehicle has been parked on a selected vacant parking area, the position of the selected parking area is conveyed to a storage medium, which is preferably transportable by the driver, preferably a key of the vehicle and/or a cell phone of the driver and/or a chip card, is subsequently stored on the storage medium and is preferably additionally displayed. The advantage of this refinement is that the position of the vehicle on the selected parking area is always available and no longer needs to be noted down by the driver.

It is likewise preferred if the navigation apparatus or the storage medium transmits the position of the selected parking area to a car park management system of the parking facility. As a result, the car park management system of the parking facility always has current data available pertaining to the situation concerning vacant parking areas.

It is advantageous for the same reason if, when the parking facility is left, the position of the selected parking area, which is now vacant again, is transmitted to the car park management system of the parking facility.

The position of the at least one vacant parking area can, in a further exemplary embodiment, be calculated from a distance measurement from at least one vehicle or at least one infrastructure element to other vehicles or to other infrastructure elements, the vehicles or infrastructure elements being arranged within a vicinity having a previously stipulated radius around the vehicle looking for a vacant parking area. The advantage of this exemplary embodiment is that the method is particularly simple to perform and locates parking areas for a vehicle easily and quickly in any area.

In order to ensure correct calculation of vacant parking areas, it is furthermore advantageous if further information pertaining to the parking area situation, preferably about resident parking zones or no-stopping zones, is conveyed by the at least one infrastructure element and/or provided from a digital map of the navigation apparatus and used to calculate the position of the at least one vacant parking area. The digital map is normally part of the navigation apparatus.

The above object is also achieved by a driving assistance apparatus for parking a vehicle in a vacant parking area in accordance with embodiments of the invention.

In particular, the driving assistance apparatus has a computing apparatus and a navigation apparatus. The position of at least one vacant parking area is calculated by the computing apparatus on the basis of a vehicle-to-vehicle and/or a vehicle-to infrastructure communication from the current position of the vehicle, and the calculated position of the vacant parking area is then conveyed to a navigation apparatus of the vehicle. The driving assistance apparatus is designed to carry out the method steps described above and has the advantages indicated above. The C2C and/or C2I communication is preferably performed by the computing apparatus of the vehicle, which has appropriate transmitters and receivers.

The above object is likewise achieved by a computer program product for a driving assistance apparatus for parking a vehicle in a vacant parking area, the computer program product having features in accordance with embodiments of the invention.

In particular, the computer program product is intended to execute a computer program after implementation thereof, wherein the computer program product performs the methods described above having the advantages indicated above after the implementation.

Further advantages, features and possible applications of the present invention emerge from the description of exemplary embodiments and the figures that follows. Here, all of the features described and/or depicted in the figures form the subject matter of the present invention, even independently of the composition thereof in the claims, or the back-references thereof.

Remote control of assistance systems using an "insecure" device, for example a smartphone, is prohibited for safety reasons. It is not possible to ensure that the control commands arrive at the vehicle with zero latency and were not manipulated.

BRIEF DESCRIPTION OF THE DRAWINGS

An exemplary embodiment of the invention is depicted in the drawings and will be described in more detail below.

In the drawings, in each case schematically.

DETAILED DESCRIPTION

Figure 1:
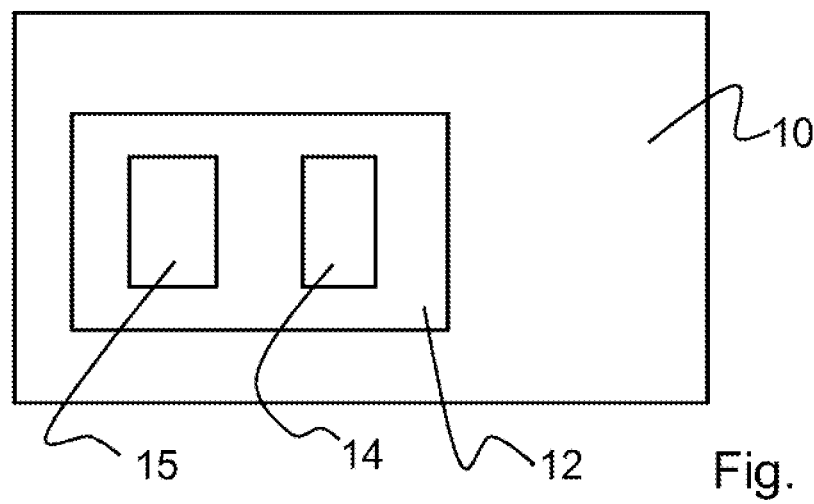
FIG. 1 shows a vehicle with a driving assistance apparatus according to the invention.

A vehicle 10 depicted in FIG. 1, for example an automobile that is supposed to be parked on a parking area, is equipped with a positioning system, for example a GPS system 12, which contains a computing apparatus 14 and a navigation apparatus 15.

Figure 2:
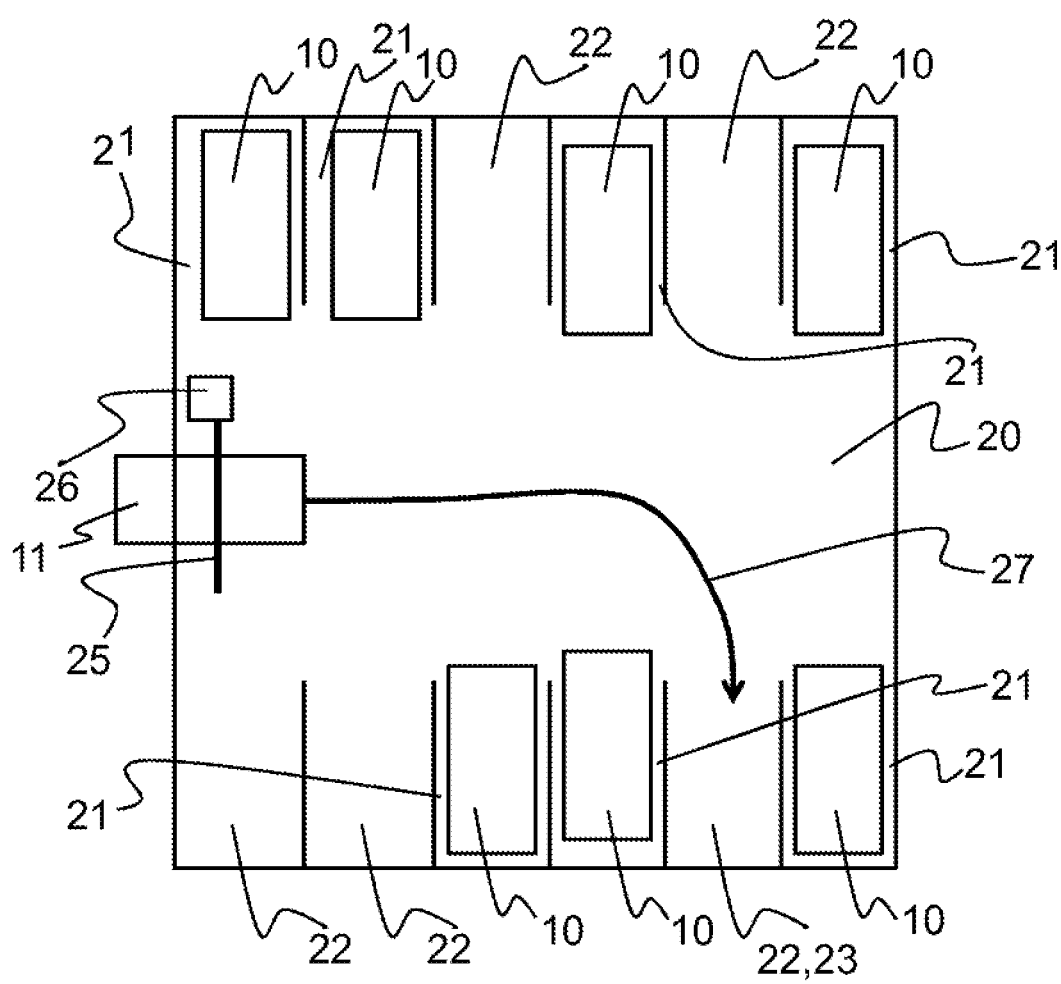
FIG. 2 shows a first exemplary embodiment of the use of the method according to the invention in a parking facility.

When an arriving vehicle 11 in a parking facility, for example in a parking garage 20 depicted in FIG. 2, looks for a parking area, the vehicle is initially at an entrance barrier 25 to the parking garage 20. The arriving vehicle 11 is equipped analogously to the vehicle 10 depicted in 1.

The parking garage 20 has parking areas 21 that are occupied by vehicles 10. The parking areas 22 are vacant, on the other hand, which means that it is possible to park on them.

At the entrance barrier 25 of the parking garage 20, short-range radio (e.g. infrared, Bluetooth, DSRC, ITS-G5, WLAN, etc.) is used to transmit information about which parking areas 22 are vacant from the car park management system 26 integrated in the entrance barrier 25 to the computing apparatus 14 of the vehicle 11, i.e. by means of a vehicle-to-infrastructure communication. The positions of the vacant parking areas 22 can be indicated for example as absolute positions of the GPS system 12 or as relative positions, e.g. with reference to the position of the barrier 25.

The driver wishes to park his vehicle 11 in a narrow parking area 22.

He activates the parking assistance system and gets out of his vehicle 11. While he is close to his vehicle, he starts an appropriate app on his smartphone. The vehicle 11 uses a WLAN to stream a live image of the vehicle surroundings to the smartphone, for example a bird's eye view/top view of his vehicle 11. In the bottom image region of the streamed video, a unique flashing pattern is shown by the vehicle. This flashing pattern is generated at random and is not predictable by outsiders. The frequency of the flashing code matches the frame rate of the video. If the frame repetition frequency is 25 hertz, for example, then no flashing patterns having a higher frequency are transmitted. The driver can now monitor the surroundings of the vehicle on the smartphone.

In order to start the parking process, he places his radio key onto the smartphone display, so that the lens in the vehicle key can capture the flashing code. The radio key returns the flashing codes to the vehicle 11 by radio.

The vehicle 11 compares the received signals with the transmitted signals. It is thus possible to monitor the round trip time and the integrity of the signals. If these two parameters are OK, the driver is shown on his smartphone that he can now start the parking process.

He holds down the start button on the radio key. The vehicle begins the parking process.

If the WLAN connection between the vehicle and the smartphone now breaks off, for example, or if the smartphone app terminates because the battery is empty, or because another app comes to the fore, for example, then the radio key will no longer transmit valid codes to the vehicle. The vehicle will immediately abort the parking process.

The GPS system 12 is put into what is known as the parking garage mode after the information about vacant parking areas 22 has been transmitted. On the basis of the data conveyed by the parking garage, the computing apparatus 14 now calculates the positions of the vacant parking areas 22 in the reference system of the in-vehicle GPS system 12 and presents them to the driver on a special display provided for this mode. The driver can now select a parking area for his vehicle 11 that is suitable for him.

The navigation apparatus 15, which receives the calculated position data from the computing apparatus 14, can then be used to ascertain a routing to a parking area 23 selected by the driver, for example, and to make said routing available to the driver. The driver then moves to the selected parking area 23 with his vehicle on the basis of the calculated routing 27 and parks his vehicle 11 there. The routing is advantageous in particular in large, confusing and highly frequented parking facilities, for example multistory parking garages.

If the vehicle 11 is now parked on the selected parking area 23 in the parking garage, the navigation apparatus 15 of the vehicle 11 stores the position of the latter. This function can be triggered e.g. by the engine being switched off at the position of the selected parking area 23. The noted position of the now occupied parking area 23 is transmitted by the navigation apparatus 15 to a storage medium, not depicted, for example to the key of the vehicle 11, to a mobile phone of the driver or to another device (e.g. chip card) having a preferably wireless communication capability. The position of the parking area 23 can be displayed on the storage medium on request. This allows the driver to find his vehicle 11 more quickly on returning to it.

The driver now leaves the parking garage 20. At the exit, the car park management system 26 records which parking area the vehicle 11 is on, e.g. by interrogating the storage medium. Since the storage medium has stored the position of the vehicle 11 or of the selected parking area 23, it transfers it to the car park management system 26 of the parking garage 20. The car park management system 26 now knows that the parking area 23 selected by the driver, the position of which has been conveyed to the car park management system 26, is occupied.

After some time, the driver returns to the parking garage 20 in order to travel onward in his vehicle 11.

In a preferred exemplary embodiment, the parking garage 20 has a multiplicity of reading points to which the position of the vehicle 11 can be transmitted from the storage medium. Such a reading point is located at the barrier 25 and/or at the doors and/or pay stations of the parking garage, for example. At the request of the driver, the position of the vehicle 11 and possibly the way thereto is displayed at such a reading point, so that the driver can quickly find his vehicle 11.

The position of the vehicle 11 on the parking area 23, which position is stored in the navigation apparatus 15, is preferably also used as a starting position for the next route calculated by the navigation apparatus 15.

The position of the parking area 23 that has become vacant is transmitted to the car park management system 26 by the storage medium or the navigation apparatus 15 by short-range radio when the vehicle 11 exits. The car park management system 26 now knows that the applicable parking area 23 on which the vehicle 11 had previously parked is now vacant again.

Instead of the short-range communication with the car park management system 26, communication can also take place with an applicable car park management server via GPS, UMTS, LTE, WiMax, WLAN, etc.

The proposed method can be performed with comparatively little technical complexity and without additional hardware in the vehicle.

Figure 3:
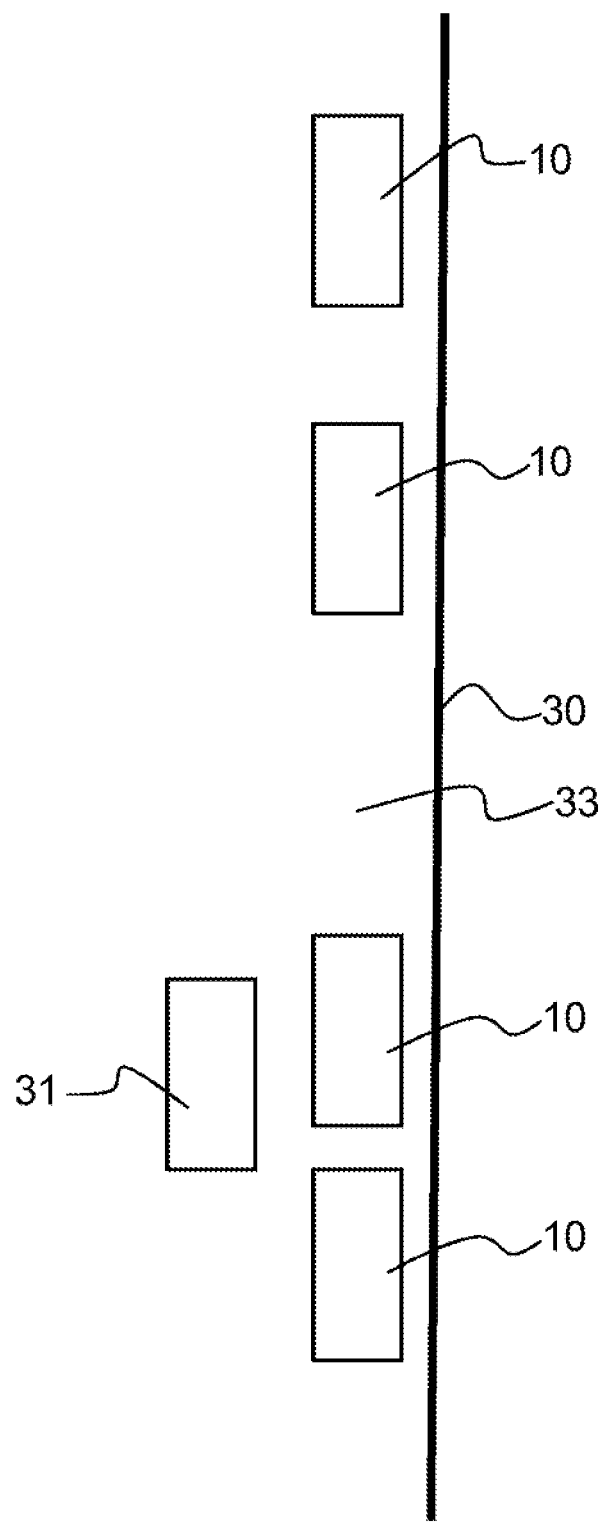
FIG. 3 shows a second exemplary embodiment of the use of the method according to the invention.
Figure 4:
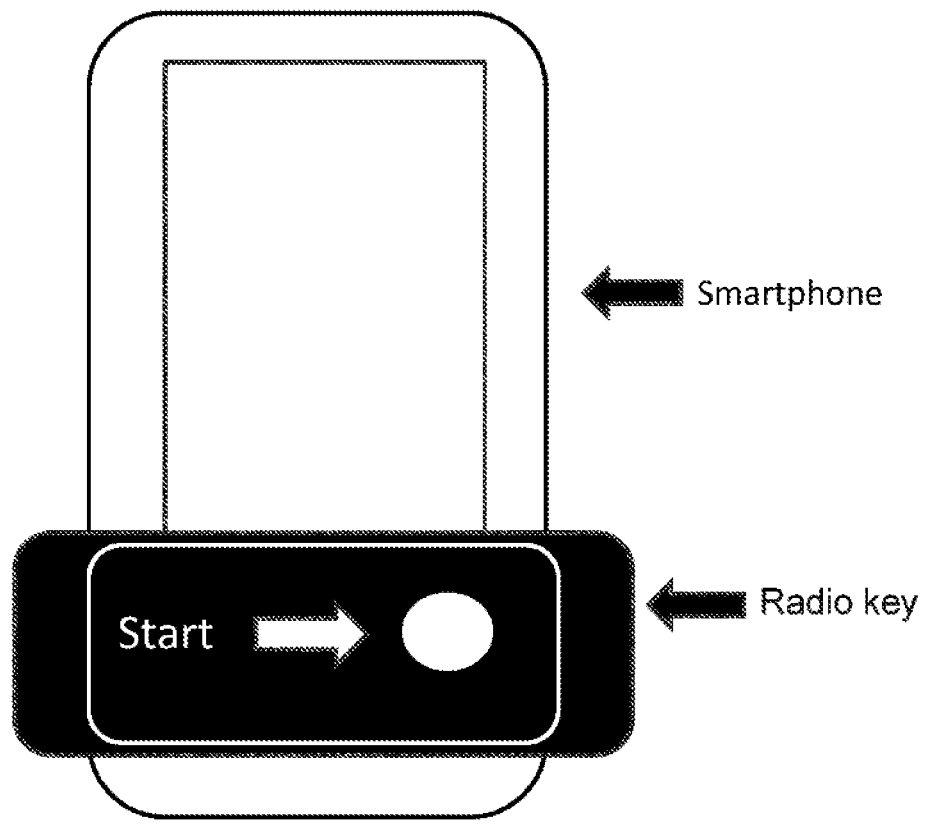
FIG. 4 shows a smartphone and a vehicle key.

In a further exemplary embodiment, depicted by FIG. 3, an explanation is provided as to how looking for a car park in the downtown area of cities can be improved. When looking for a car park, there is a considerable burden on the looker. Often, appointments cannot be kept and the environment is polluted by a lengthy search for a car park. The method explained below could provide a remedy.

The method depicted by FIG. 3 is used to find parking spaces, for example at the edge 30 of a road. Many vehicles 10, corresponding to the vehicle 10 depicted in 1, are parked here. The vehicle 31 looking for a parking area also has the same design.

To perform the method according to the invention, it is advantageous if the vehicles 10, 31 have distance sensors installed at the front, at the rear or at the sides of the vehicles 10, 31 involved (for example ultrasonic, infrared or radar sensors, camera, etc.). By means of the computing unit 14, the vehicles 10, 31 can also perform a vehicle-to-vehicle communication and/or vehicle-to-infrastructure communication. Furthermore, there is a navigation apparatus 15.

While looking for a car park, the driver of the looking vehicle 31 first uses a key or a command to establish a connection to vehicles 10 in a vicinity having a previously defined radius around the vehicle 31.

As a result, the already parked vehicles 10 in the vicinity are "woken" from what is known as a sleep mode (inactive state) and put into the active state. The vehicles 10 that are now in the active state then measure their distances from the respective next vehicle 10 or from the next infrastructure device (not depicted), for example a set of traffic lights or a road sign, at the front, at the rear and/or to the sides.

Vehicle-to-vehicle communication is used to convey the ascertained distance data from the vehicles 10 in the vicinity to the computing apparatus 14 of the vehicle 31 looking for a parking area. Furthermore, the positions of the respective vehicles 10 are transmitted to the computing apparatus 14 of this vehicle 31. The computing apparatus 14 of the GPS system 12 can now discover the respective available area for parking from the information transmitted via C2C communication. If said area is large enough, the applicable vacant space is identified as a parking area and displayed to the driver as a parking area available for parking. In a situation depicted in 3, the parking space 33 is one such parking area.

The navigation apparatus 15 can calculate the route from the current position of the vehicle 31 looking for a parking area to the vacant parking area 33 from the data ascertained by the computing apparatus 14 and can make said route available to the driver for the purpose of quickly finding the parking space. If there are multiple vacant parking areas in the vicinity of the vehicle 31, these can be presented on a display of the computing apparatus 14, so that the driver can select a parking area that is suitable for him.

To determine parking spaces, it is also possible for other information to be included that is conveyed to the computing apparatus 15 of the vehicle 31 preferably via vehicle-to-infrastructure communication, for example about resident parking zones or no-stopping zones.

The invention claimed is:

1. A method for assisting in the parking of a vehicle in a vacant parking area, wherein a position of at least one vacant parking area is calculated on the basis of a vehicle-to-vehicle and/or a vehicle-to-infrastructure communication from a current position of the vehicle and is conveyed to a navigation apparatus of the vehicle, characterized in that a parking process is started by virtue of a radio key of the vehicle being placed onto a smartphone display, so that a lens in the vehicle radio key captures a flashing code and the radio key returns the flashing code to the vehicle by radio.

2. The method of claim 1, characterized in that the position of the vacant parking area is conveyed to the navigation apparatus when the vehicle is in a previously defined region with reference to the vacant parking area close to a barrier of a parking facility.

3. The method of claim 1, characterized in that after the vehicle (11) has been parked on a selected vacant parking area, the position of the selected parking area is conveyed to a storage medium, which is transportable by the driver, a key of the vehicle and/or a cell phone of the driver and/or a chip card, is subsequently stored on the storage medium and is additionally displayed.

4. The method of claim 1, characterized in that the navigation apparatus or the storage medium transmits the position of the selected parking area to a car park management system of the parking facility.

5. The method of claim 1, characterized in that when the selected parking area is left, the position of the parking area, which has become vacant again, is transmitted to the car park management system of the parking facility.

6. The method of claim 1, characterized in that the position of the at least one vacant parking area is calculated from a distance measurement from at least one vehicle or at least one infrastructure element to other vehicles or to other infrastructure elements that are arranged within a vicinity having a previously stipulated radius around the vehicle looking for a vacant parking area.

7. The method of claim 1, characterized in that further information pertaining to the parking area situation, preferably about resident parking zones or no-stopping zones, is conveyed by the at least one infrastructure element and/or provided from a digital map of the navigation apparatus and used to calculate the position of the at least one vacant parking area.

8. A driving assistance apparatus for parking a vehicle in a vacant parking area using a computing apparatus and a navigation apparatus, wherein a position of at least one vacant parking area is calculated by the computing apparatus on the basis of a vehicle-to-vehicle and/or a vehicle-to-infrastructure communication from a current position of the vehicle, and the calculated position of the vacant parking area is then conveyed to a navigation apparatus of the vehicle, characterized in that a parking process is started by virtue of a radio key of the vehicle being placed onto a smartphone display, so that a lens in the vehicle radio key captures a flashing code and the radio key returns the flashing code to the vehicle by radio.

9. The driving assistance apparatus of claim 8, characterized in that the position of the vacant parking area is conveyed to the navigation apparatus by the computing apparatus when the vehicle is in a previously defined region with reference to the vacant parking area close to a barrier of a parking facility.

10. The driving assistance apparatus of claim 8, characterized in that after the vehicle has been parked on a selected vacant parking area, the position of the selected parking area is conveyed by the navigation apparatus to a storage medium, which is transportable by the driver, on a key of the vehicle and/or a mobile phone of the driver and/or a chip card, is stored on the storage medium and is additionally displayed.

11. The driving assistance apparatus of claim 8, characterized in that the navigation apparatus or the storage medium transmits the position of the selected parking area to a car park management system of the parking facility.

12. The driving assistance apparatus of claim 8, characterized in that when the selected parking area is left, the navigation apparatus transmits the position of the parking area, which has become vacant again, to the car park management system of the parking facility.

13. The driving assistance apparatus of claim 8, characterized in that the computing apparatus calculates the position of the at least one vacant parking area from a distance measurement from at least one vehicle or at least one infrastructure element to other vehicles or to other infrastructure elements that are arranged within a vicinity having a previously stipulated radius around the vehicle looking for a vacant parking area.

14. The driving assistance apparatus of claim 8, characterized in that the infrastructure element conveys further information pertaining to the car park situation, preferably about resident parking zones or no-stopping zones, to the computing apparatus and the computing apparatus uses this information to calculate the position of the at least one vacant parking area.

* * * * *